United States Patent

Bottomley et al.

[11] Patent Number: 6,134,260
[45] Date of Patent: Oct. 17, 2000

[54] METHOD AND APPARATUS FOR FREQUENCY ACQUISITION AND TRACKING FOR DS-SS CDMA RECEIVERS

[75] Inventors: Gregory E. Bottomley; Raymond L. Toy; Sandeep Chennakeshu; Karl J. Molnar, all of Cary, N.C.

[73] Assignee: Ericsson Inc., Research Triangle Park, N.C.

[21] Appl. No.: 08/991,770

[22] Filed: Dec. 16, 1997

[51] Int. Cl.[7] .................................................. H04R 15/00
[52] U.S. Cl. .................... 375/130; 375/150; 375/152; 375/355; 370/335
[58] Field of Search ........................... 375/200, 355, 375/344, 222, 130, 152, 150; 370/342, 335

[56] References Cited

U.S. PATENT DOCUMENTS

| | | | |
|---|---|---|---|
| 5,361,276 | 11/1994 | Subramanian | 375/1 |
| 5,559,789 | 9/1996 | Nakano et al. | 370/342 |
| 5,799,010 | 8/1998 | Lomp et al. | 370/335 |
| 5,898,665 | 4/1999 | Sawahashi et al. | 370/342 |
| 5,943,375 | 8/1999 | Veintimilla | 375/355 |

FOREIGN PATENT DOCUMENTS

| | | |
|---|---|---|
| 725496 | 8/1996 | European Pat. Off. |
| 788225 | 10/1997 | European Pat. Off. |
| WO97/37437 | 10/1997 | WIPO |

OTHER PUBLICATIONS

Urs Fawer, *A Coherent Spread–Spectrum Diversity–Receiver with AFC for Multipath Fading Channels*, IEEE Transactions on Communications, vol. 42, No. 2/3/4 (Feb., Mar., Apr. 1994), pp. 1300–1311.

Oliver C. Mauss et al., "*Carrier Frequency Recovery for a Fully Digital Direct–Sequence Spread–Spectrum Receiver: A Comparison*", Aachen. Univ. of Tech., IEEE (1993), pp. 392–395.

W. S. Yuan et al., "*Algorithms for Carrier Acquisition of QAM Signals*", 31$^{st}$ Annual Conference on Info. Sciences and Systems (CISS), Baltimore, MD, (Mar. 1997) pp. 1–6.

Urs Fawer, "*A Coherent Spread–Spectrum Rake–Receiver with Maximum–Likelihood Frequency Estimation*", Proc. ICC '92, pp. 471–475 (Jun., 1992).

*Primary Examiner*—Stephen Chin
*Assistant Examiner*—Shuwang Liu
*Attorney, Agent, or Firm*—Burns, Doane, Swecker & Mathis, L.L.P.

[57] ABSTRACT

Systems and methods for frequency acquisition and channel tracking in a direct sequence code division multiple access system are described. Frequency estimates are prepared and refined, which estimates are also used in the channel tracking process.

24 Claims, 6 Drawing Sheets

METHOD AND APPARATUS FOR FREQUENCY ACQUISITION AND TRACKING FOR DS-SS CDMA RECEIVERS

BACKGROUND

The present invention relates generally to techniques and systems for frequency acquisition and tracking and, more particularly, to frequency acquisition and tracking in direct-sequence spread-spectrum (DSSS) code division multiple access (CDMA) systems.

Wireless communications is expanding at a phenomenal rate, as more radio spectrum becomes available for commercial use and as cellular phones become commonplace. In addition, there is currently an evolution from analog communications to digital communications. In digital communications, speech is represented by a series of bits, which are modulated and transmitted from a base station to a phone. The phone demodulates the received waveform to recover the bits, which are then converted back into speech. There is also a growing demand for data services, such as e-mail and Internet access, which require digital communications.

There are many types of digital communications systems. Traditionally, frequency-division-multiple-access (FDMA) has been used to divide the spectrum up into a plurality of radio channels corresponding to different carrier frequencies. These carriers may be further divided into time slots, referred to as time-division-multiple-access (TDMA), as is done in the D-AMPS, PDC, and GSM digital cellular systems.

If the radio channel is wide enough, multiple users can occupy the same channel using spread spectrum (SS) techniques and code-division-multiple-access (CDMA). IS-95 and J-STD-008 are examples of CDMA standards. With direct sequence spread spectrum (DS-SS), information symbols are multiplied by sequences of symbols referred to as chips. This multiplication spreads the information symbols in the frequency band. At the receiver, correlations to the chip sequences are used to recover the information symbols. Spreading allows the system to operate at a low chip signal-to-noise ratio (SNR). If thermal noise is not too great, then noise from other users is tolerable. Thus, multiple user signals can occupy the same bandwidth at the same time, giving rise to CDMA.

Digital communication receivers typically include a radio processor and a baseband processor. The radio processor filters, amplifies, and mixes the radio signal down to baseband. At some point the signal is sampled and quantized, ultimately providing a sequence of baseband received samples. Since the original radio signal has in-phase (I) and quadrature (Q) components, the baseband samples typically have I and Q components, giving rise to complex, baseband samples. Baseband signal processing is then used detect the bits that were transmitted.

In the mixing down operations, mixing is based on a reference oscillator and knowledge of the transmit carrier frequency. Due to manufacturing and temperature variability, the output of the reference oscillator is not exactly at the desired, fixed frequency. As a result, the radio signal is not mixed exactly to the desired baseband frequency (typically 0 Hz). This gives rise to frequency error which degrades performance.

In narrowband systems, there are a variety of techniques for acquiring and tracking frequency error. If these narrowband techniques were applied to chip values in a CDMA system, poor performance would result because of the extremely low chip SNR.

Frequency acquisition and tracking techniques designed for direct sequence spread spectrum receivers have been developed. One approach is given by an article authored by Mauss et al., entitled "Carrier frequency recovery for a fully digital direct-sequence spread-spectrum receiver: a comparison" and found in VTC '93, Secaucus, N.J. In this article baseband samples are first despread, using knowledge of the spreading sequences, giving rise to a sequence of despread values. A differential detector is then applied to the sequence of despread values to form a sequence of detector outputs. The detector outputs are complex numbers in rectangular coordinates, which can be viewed as having an amplitude and a phase angle. The sequence of complex detector outputs are converted into a sequence of amplitude and phase angle values. The amplitude values are modified by some arbitrary function f. The modified amplitude and original phase angle are next converted back into rectangular coordinates. The modified detector outputs are summed over time and the phase angle of the sum is taken and scaled to give an estimate of the frequency error. If the despread values correspond to known symbols, then the function f replaces the amplitude with known differential symbol values. Otherwise, the amplitudes are not replaced. The frequency error can be estimated periodically and filtered to obtain a smoothed estimate, which can be used to adjust the reference oscillator.

For initial frequency acquisition, this approach is limited by the amount of coherent integration provided by despreading prior to differential detection. Only one symbol period of coherent integration is employed, followed by differential detection, which amplifies the noise.

Another approach is given in an article authored by U. Fawer, entitled "A coherent spread-spectrum diversity-receiver with AFC for multipath fading channels", found in IEEE Trans. Commun., vol. 42, pp. 1300–1311, February/March/April 1994. According to this article, frequency error estimation is performed after channel (phase) estimation and Rake combining. However, frequency error estimation is better performed before channel estimation because frequency errors will degrade channel estimation. Thus, there continues to be a need to accurately estimate and track frequency error in direct-sequence spread-spectrum receivers.

SUMMARY

The aforementioned problems are solved by the present invention. According to an exemplary embodiment of the present invention, a frequency acquisition approach is described in which the amount of coherent integration used is adapted, based on initial and refined frequency error estimates. The frequency error estimates are used to adjust despread samples. The adjusted samples are accumulated and fed back to generate the refined frequency error estimate. A predetermined number of iterations are performed until a desired frequency accuracy is reached.

According to another exemplary embodiment, frequency error tracking is performed in conjunction with channel tracking, so that each operation benefits from the other. Data samples are despread and then phase unwrapped prior to phase correction processing. The corrected values are then used to generate channel tap estimates, as well as to adjust a phase locked loop.

BRIEF DESCRIPTION OF THE DRAWINGS

These and other objects, features and advantages of the present invention will be readily understood by those skilled in the art upon reading the following detailed description in conjunction with the drawings, wherein.

DETAILED DESCRIPTION

Figure 1:
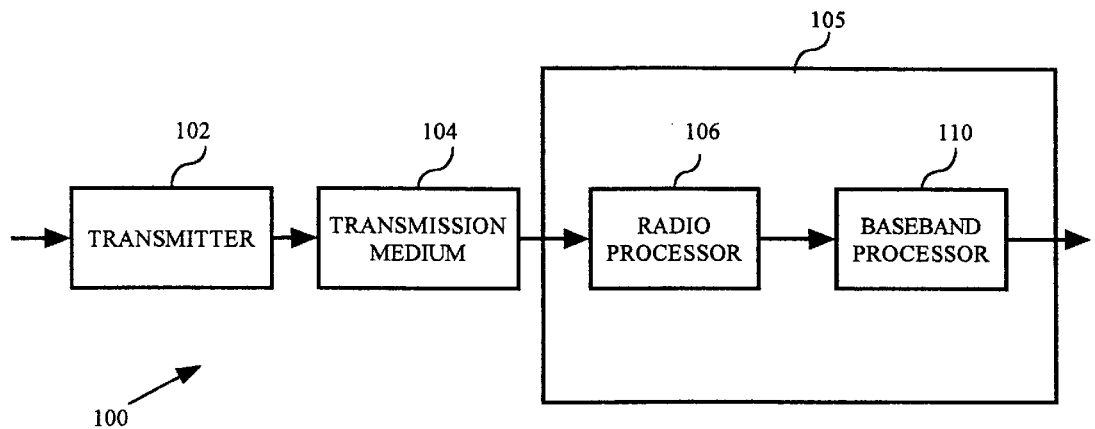
FIG. 1 is an exemplary DS-SS communications system.

An exemplary digital communications system 100 is shown in FIG. 1. Digital symbols are provided to transmitter 102, which maps the symbols into a representation appropriate for the transmission medium. The transmitted signal passes through the transmission medium 104 and is received at receiver 105. The receiver 105 includes a radio processor 106 and a baseband signal processor 110. The radio processor filters, amplifies, and mixes the signal down to baseband. The baseband processor 110 takes the baseband signal and produces estimates of the symbol values. Soft or reliability information may also be provided. Ultimately, these digital symbols may be converted into speech, text or images. In either radio processor 106 or baseband processor 110, the baseband signal or an IF signal is sampled and quantized.

For wireless communications, the transmitter emits electromagnetic waveforms from an antenna, the medium is the radio propagation environment, and the receiver employs one or more antennas to recover the transmitted signal. While the present invention is described in the context of radio communications, it is not limited to such systems. Instead, the present invention is also applicable to other systems, e.g., wireline communications and magnetic storage systems. In such applications the radio processor is generalized to a device that extracts data from the transmission or storage medium.

The present invention is described herein in the context of a system employing an independent pilot channel, such as the pilot channel described for use in the IS-95 downlink, as compared with traffic channels over which payload data is transmitted. However, the invention is not limited to such systems, as it is also applicable to systems employing pilot symbols embedded in data channels or to systems having no pilot symbols or channel at all.

Figure 2:
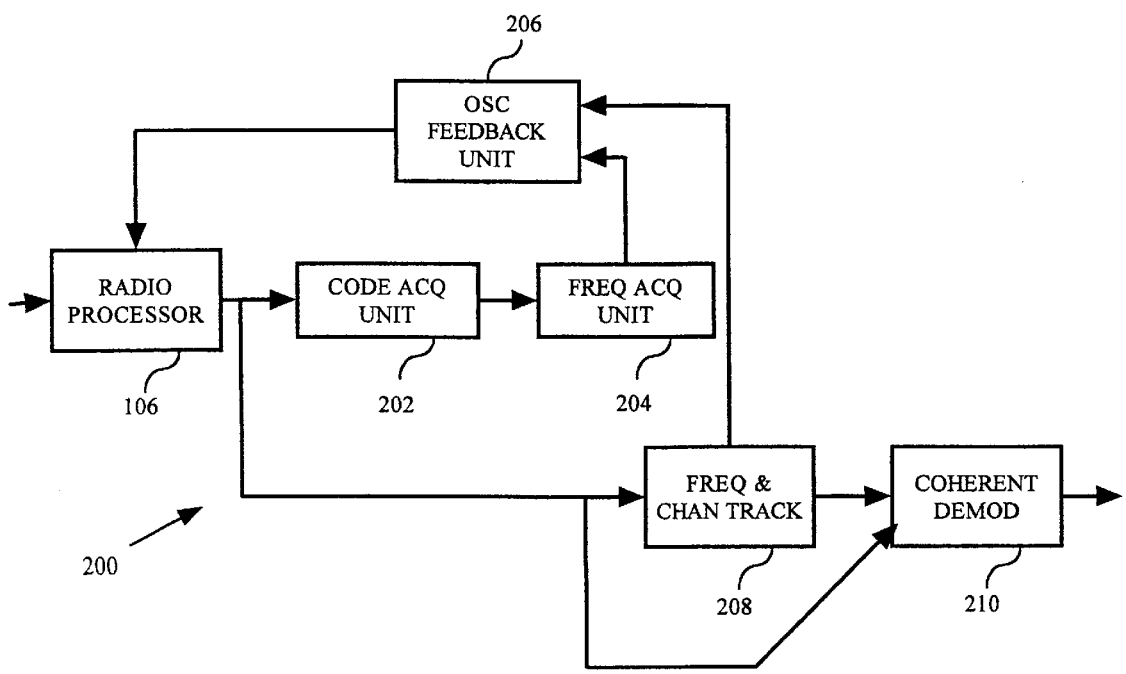
FIG. 2 is a DS-SS receiver according to an exemplary embodiment of the present invention.

A DS-SS receiver according to an exemplary embodiment of the present invention is illustrated in FIG. 2, where like reference numerals are used to refer to like elements. The receiver 200 comprises a radio processor 106, which produces data samples for baseband processing. Initially, these samples are processed by code acquisition unit 202, which correlates the samples to the pilot channel despreading code to synchronize to one or more rays or echoes of the transmitted signal. Once this is accomplished, frequency acquisition unit 204 has timing information for despreading the received signal and estimating the frequency error, again using the pilot channel. This error is provided to oscillator feedback unit 206, which may or may not filter (e.g., smooth) the frequency error estimate prior to sending a correction signal to radio processor 106 to correct the reference oscillator circuit (not shown), which is typically implemented as a voltage-controlled crystal oscillator (VCXO).

After frequency acquisition, demodulation of the received information can be performed. Baseband samples are provided to frequency and channel tracking unit 208, which continues to estimate frequency error as well as track a (potentially) time-varying channel using the pilot channel. Frequency error and channel tap estimates are used to coherently demodulate symbols using despread values corresponding to an information bearing, traffic channel. For example, frequency error can be removed from traffic despread values, which are also multiplied by the conjugate of the channel tap estimates. The real part of the result provides soft bit values, which may be used in further processing, such as convolutional decoding.

Figure 3:
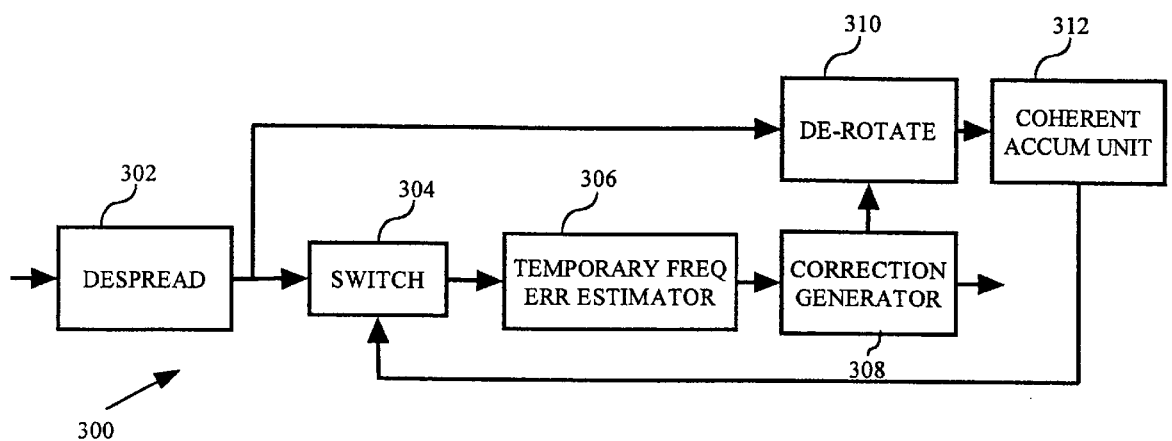
FIG. 3 is a DS-SS frequency acquisition unit according to an exemplary embodiment of the present invention.

A DS-SS frequency acquisition unit according to an exemplary embodiment of the present invention is illustrated in FIG. 3. The frequency acquisition unit 300 begins with a despread unit 302, which correlates the received samples to pilot channel spreading sequences to form despread pilot values. Demodulation of the pilot signal can also be performed by unit 302. The correlation length need not equal the traffic channel symbol period. If the correlation length is too short, the SNR of the despread value will be too low for adequate performance. If the correlation length is too long, the frequency error will cause a loss in signal strength. Analysis or simulation can be used to determine an optimum correlation length for a particular system design as a function of frequency error. Typically the correlation length is set equal to the optimum value for the worst case frequency error. For systems designed to operate in accordance with IS-95, for example, it is preferable to make the correlation length 64 and to use a subsequence of the pilot code for despreading that aligns with the Walsh code boundaries of the traffic channels for despreading, so that interference with other channels is minimized. If a correlation length of 64 is not suitable, values such as 32, 96 and 128 are helpful to reduce channel interference.

Switch 304 is initially set to pass these despread pilot values to temporary frequency error estimator 306, which uses the output of switch 304 to form a temporary frequency error estimate. This frequency error estimate is provided to correction generator 308, which forms a frequency correction factor. For example, the initial frequency correction factor could be set equal to the temporary frequency error estimate from estimator 306. If the frequency correction factor is initialized to zero, then the frequency correction factor could be set to its previous value plus the temporary frequency error estimate.

The frequency correction factor is used to remove frequency error from successive despread values in de-rotate unit 310. An exemplary de-rotation technique is described below with respect to FIG. 5. Because the residual frequency error after de-rotation is small, more coherent accumulation is possible through adding groups of successive de-rotated values in coherent accumulation unit 312. Accumulated values are provided to switch 304, which is now switched to pass accumulated values from the coherent accumulator 312 to the temporary frequency estimator 306.

The accumulated values are then used to form a second temporary frequency error estimate using temporary frequency error estimator 306. This second temporary frequency error estimate corresponds to the residual frequency error not accounted for by the first frequency correction factor. Correction generator 308 then uses the second temporary frequency error estimate in conjunction with the first frequency error correction factor to form a second frequency error correction factor. For example, the second frequency error correction factor could be the first frequency error correction factor plus the second temporary frequency error estimate. The process then continues for a number of iterations, which may be fixed or adapted, with the switch 304 set to pass accumulated values to frequency error estimator 306. For example, the number of iterations might be incremented until the residual frequency error falls below a threshold. After the fixed or adaptive number of iterations have been performed, the correction generator 308 outputs a refined estimate of frequency error. For example, the frequency error estimate could be set equal to the final frequency correction factor.

Because of noise and other impairments, it is not always desirable to set the frequency correction factor equal to its previous value plus the temporary estimate generated by unit 306. One approach is to scale the temporary frequency error estimate by a factor s that is between 0 and 1. The factor s could be adaptively set, based on received signal strength or SNR indications as well as other factors. For example, the higher the SNR, the higher the scale factor s. Also, the scaling factor s could be adapted from one iteration of the loop to the next. For example, the factor s could be made larger with each iteration.

Figure 4:
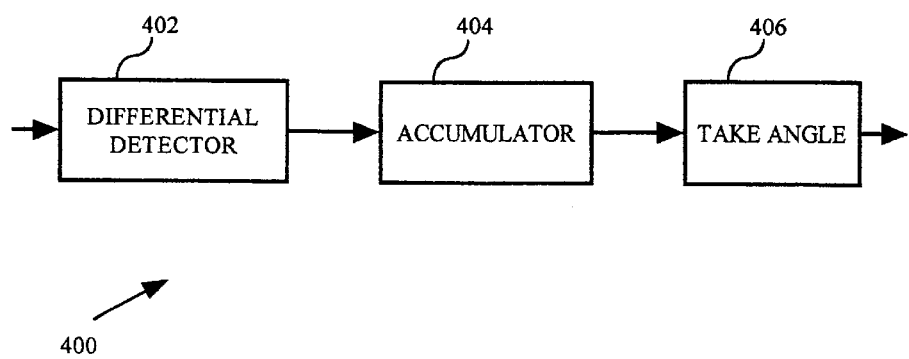
FIG. 4 is an exemplary embodiment of a temporary frequency error estimator which can be used in the unit of FIG. 3.

The temporary frequency error estimator 306 can form a frequency error estimate using any method which employs despread values. An exemplary embodiment of a temporary frequency error estimator 306 is shown in FIG. 4. Therein, temporary frequency error estimator 400 receives despread values from switch 304. These despread values are passed to differential detector 402, producing detector output values. These detector output values are accumulated in accumulator 404. The accumulated value is then supplied to take angle unit 406, which determines the angle in the complex plane of the complex number. This angle provides an estimate of the frequency error and may be scaled as needed.

Figure 5:
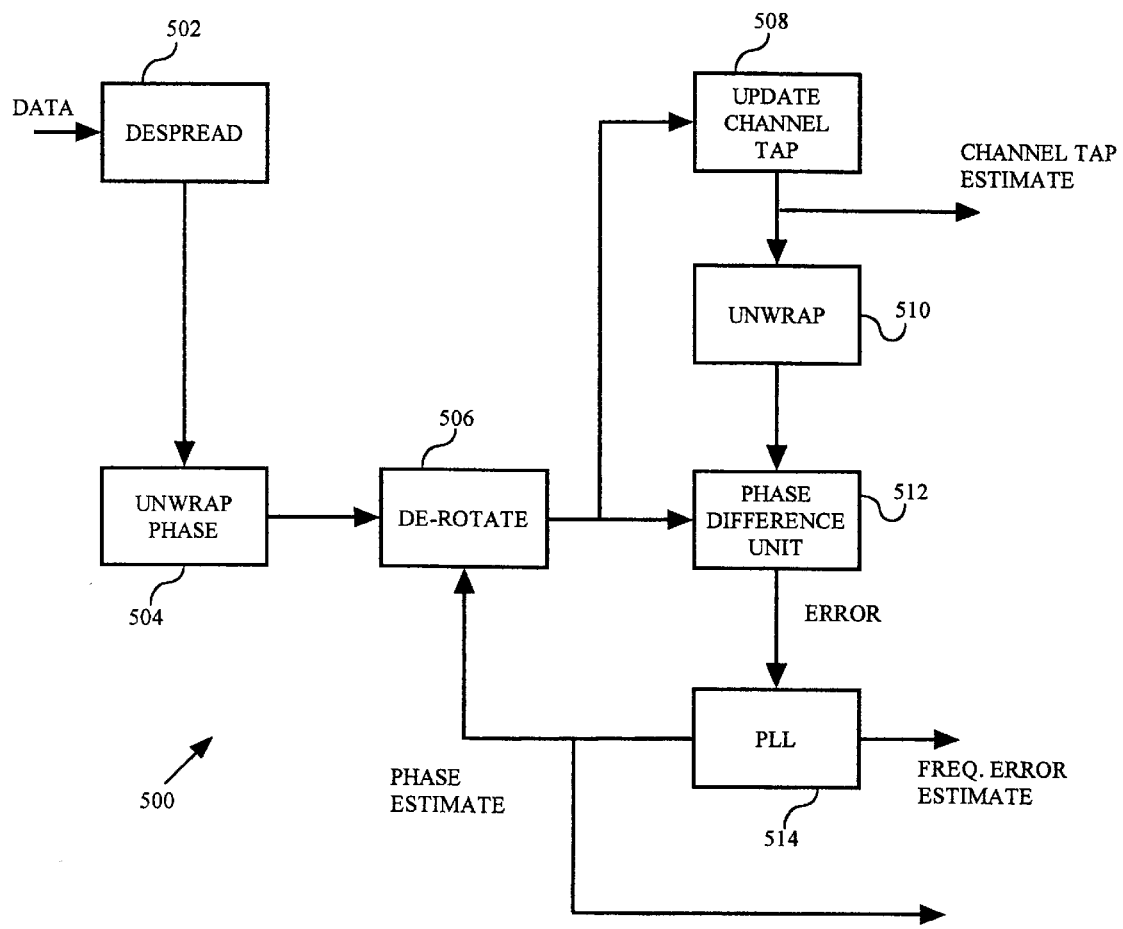
FIG. 5 is a DS-SS channel and frequency error tracker according to an exemplary embodiment of the present invention.

An exemplary DS-SS frequency error and channel tracking unit according to the present invention is illustrated in FIG. 5. Data samples are provided to despread unit 502, which despreads the data samples to form pilot correlations. Phase unwrapping, which process is described in detail below, is applied by unwrap phase unit 504. The unwrapped pilot correlation is de-rotated by de-rotate unit 506, which takes the phase estimate from phase locked loop (PLL) 514 and subtracts it from the unwrapped phase of the unwrapped pilot correlation. The result is an instantaneous estimate or measurement of the channel tap with frequency error removed. This instantaneous estimate is used by update channel tap unit 508 to update an estimate of the channel tap. Both amplitude and phase information are output for each channel tap estimate. This is typically done by smoothing the instantaneous value with previous values. However, more sophisticated channel tap tracking algorithms can be used, such as least means square (LMS), KLMS, RLS and Kalman tracking. Though not shown in FIG. 5, the channel tap estimate is provided to the coherent demodulator 210, which typically Rake combines results from different rays or echoes.

The phase of the channel tap estimate is unwrapped by unwrap unit 510 and provided to phase difference unit 512. Phase difference unit 512 forms a phase error by taking the difference between the unwrapped channel tap phase and the phase of the de-rotated, unwrapped pilot correlation. When residual frequency error is present, this pilot correlation phase will "spin" in the complex plane, creating an error signal. The phase error signal from phase difference unit 512 is provided to phase locked loop (PLL) 514, which can be a second order digital PLL that tracks both phase and its derivative (frequency). Other order PLLs can be used. The phase output of PLL 514 is provided to de-rotate unit 506 to de-rotate the unwrapped pilot correlation phase from unwrap unit 504. Though not shown, the phase estimate is ultimately used to unwrap correlations to the traffic channel, typically in the coherent demodulator 210. The frequency error estimate output of the PLL is ultimately used in a conventional frequency control (AFC) loop (not shown), which controls the reference oscillator circuit in the receiver.

Phase unwrapping addresses the problem of how phase is represented in the process of taking phase differences. For example, phase can be represented within a range of −180 degrees to +180 degrees. Consider the phase sequence 140, 160, 180, −160, −140. If phase differences are taken between adjacent pairs in this sequence, the resultant difference values are 20, 20, −340, 20. However, the −340 value is outside of the range defined for phase representations. Instead, if the phase sequence had been represented as 140, 160, 180, 200, 220, then this incorrect difference value would not have occurred. The latter representation is referred to herein as unwrapped phase.

Herein, it is assumed that the phase cannot change by more than 180 degrees from value to value. Thus, when performing an unwrapping operation, 360 degrees is added or subtracted so that the phase difference magnitude is no more than 180 degrees. Thus, when encountering the −160 degree term in the previous example, 360 degrees would be added to it, to obtain 200 degrees as the unwrapped value resulting in a difference value of 20 degrees.

Such a representation for unwrapped phase may lead to numerical overflow problems depending upon the magnitude of the unwrapped phase. To remedy this situation, the unwrapping operation can be represented with an integer counter, which gives the number of 360 terms to add (a negative counter implies subtraction). This is similar to floating point representation, except that the exponent is a number of 360 terms to add rather than multiply.

In FIG. 5, there are two unwrapping operations (blocks 504 and 510). However, ultimately, a difference of the unwrapped values is of interest. This involves taking a difference in the counter values associated with each of the unwrapping operations. Thus, if counter values get too big, a value can be subtracted from both counters and not influence their difference. This prevents overflow problems and also suggests an alternative, in which only one counter is used, which gives the number of 360 degree intervals to add or subtract to the phase error term produced by phase difference unit 512. Thus, according to another exemplary embodiment, it is possible to use only one counter, which would be incremented and decremented based on the unwrapping operations of unwrap units 504 and 510.

De-rotation in de-rotate unit 506 can be performed in a number of ways. The unwrapped pilot correlation can be represented as amplitude and unwrapped phase, in which case the phase estimate from PLL 514 is subtracted from the unwrapped phase. If the unwrapped pilot correlation is represented as real and imaginary (i.e., rectangular coordinates) with an unwrapping counter, then de-rotation can be accomplished by a complex multiplication, where the phase estimate from PLL 514 is represented as a complex number whose real part is cosine of the phase estimate and whose imaginary part is sine of the phase estimate. An additional operation to possibly correct the unwrapped phase counter would also be needed. For example, if de-rotation results in −180°−170°=−350°, then additional unwrapping is needed to represent the value as +10°. Similar unwrapping is needed at the output of phase difference unit 512.

In a Rake receiver, there would be a frequency and channel track unit 208 per Rake finger. These units generate multiple frequency error estimates, which may be used in a control feedback loop to control the reference oscillator circuit. This control feedback works can be performed in a number of ways.

First, only one of the frequency error estimates in the Rake receiver can be selected for control. For example, the error corresponding to the strongest ray, based on short or long term averaging of channel tap estimates, could be used. Alternatively, one could also select the frequency error estimate associated with the earliest arriving ray for feedback control of the oscillator circuit.

A combination of the frequency error estimates could also be used for feedback control. Simple averaging, weighted averaging or median value are examples of ways in which the frequency error estimates from each Rake finger can be combined.

Figure 6:
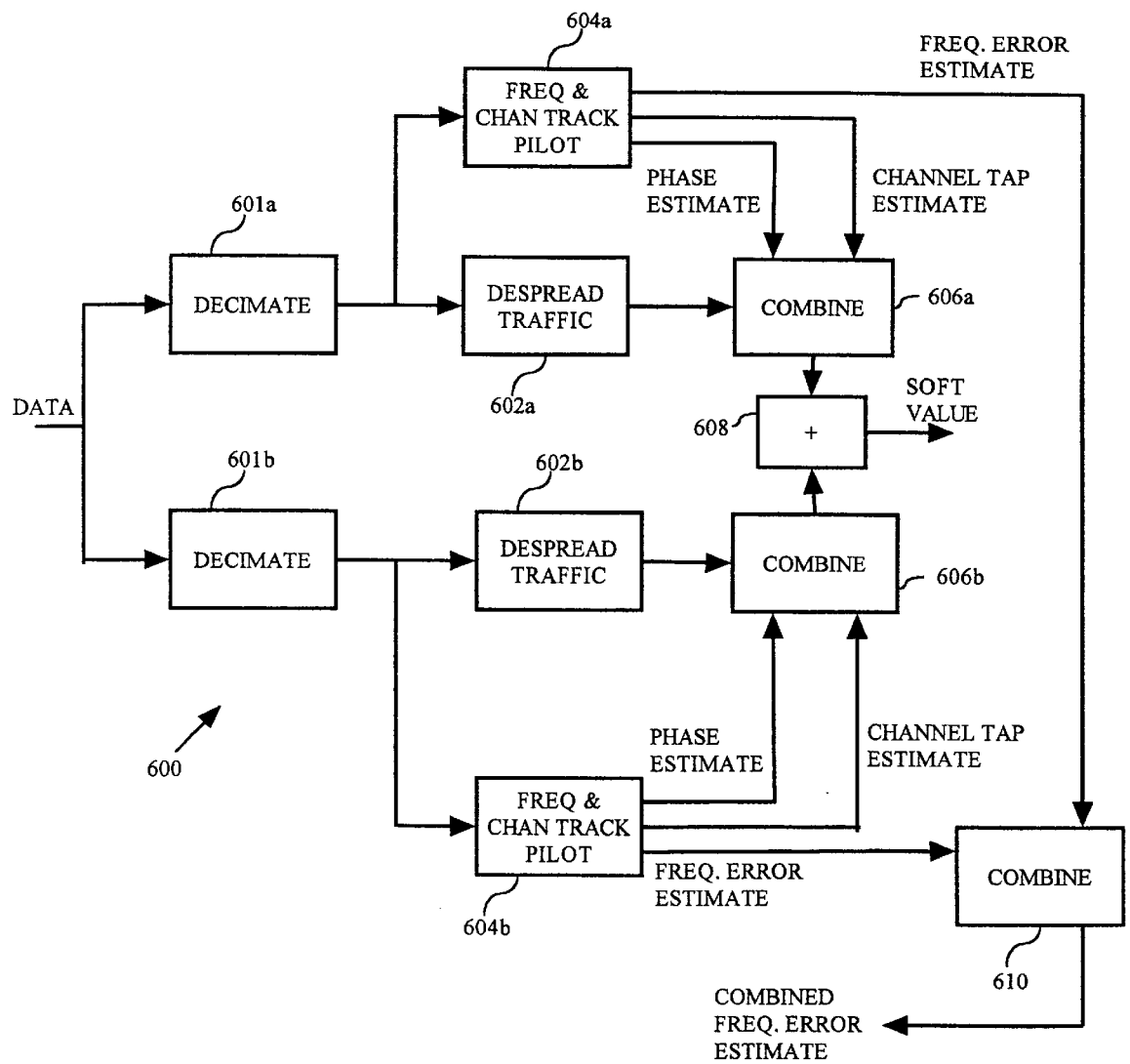
FIG. 6 depicts an exemplary embodiment of the present invention including a frequency and channel tracking unit in combination with a coherent demodulator.

An exemplary embodiment of frequency and channel tracking unit 208 together with coherent demodulation unit 210 is illustrated in FIG. 6. Data from radio processor 106 is provided to two processing branches, a and b. In branch a, decimate unit 601a samples the data once a chip period at a sampling instant corresponding to a particular echo of the signal. The decimated data are provided to despread traffic unit 602a, where the chip samples are correlated to the traffic channel despreading code, forming a despread value. The decimated data are also provided to frequency and channel track pilot unit 604a, which despreads the data using the pilot despreading code and forms a channel tap estimate, a phase estimate, and a frequency error estimate, as described in FIG. 5. Note that despreading of the pilot and traffic channels can be performed jointly, sharing circuitry. The phase estimate and channel tap estimate are provided to combine unit 606a, which combines these estimates with the despread value as described below. The combined value is added in adder 608 with a combined value from processing branch b to form a soft value. This soft value corresponds to the information symbol being demodulated and indicates a level of confidence. Processing branch b operates in a manner similar to processing branch a, except that the decimate unit is controlled to correspond to a different signal image. The frequency error estimates from branches a and b are provided to combine unit 610, which combines these to form a combined frequency error estimates as described previously. In FIG. 6, frequency error estimates from different signal processing branches are combined to form a combined value.

Figure 7:
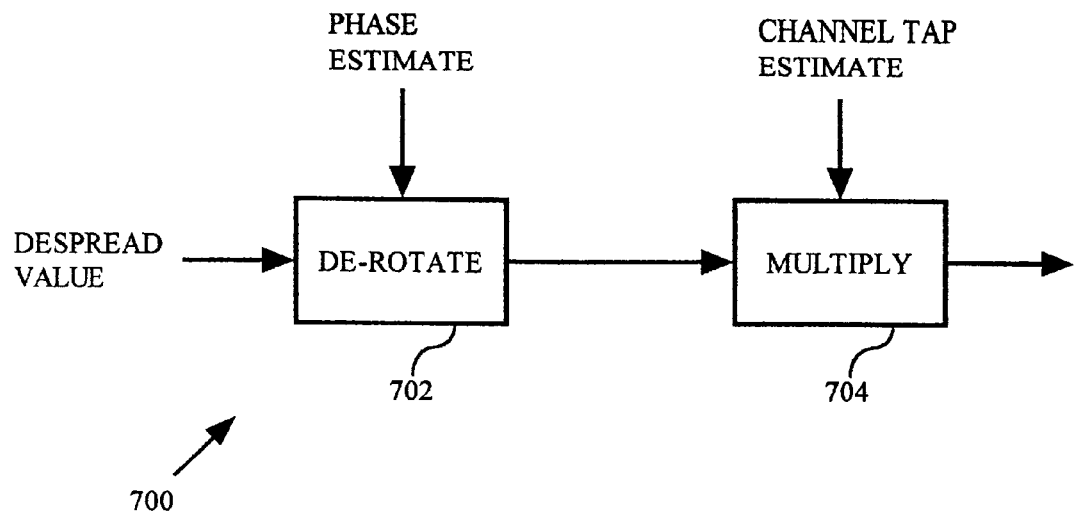
FIG. 7 is a block diagram of an exemplary combine unit which can be used in the embodiment of FIG. 6.

An exemplary embodiment of combine unit 606a is given in FIG. 7. The despread value is de-rotated in de-rotate unit 702 using the phase estimate. De-rotate unit 702 operates in a like manner to de-rotate unit 506 described previously. The de-rotated value is then multiplied by the conjugate of the channel tap estimate in multiply unit 704, producing the combined value. If the information symbol is binary (+1 or −1), then only the real part of the product is needed. For other cases, such as QPSK symbols or DBPSK symbols, both the real and imaginary parts are needed.

Figure 8:
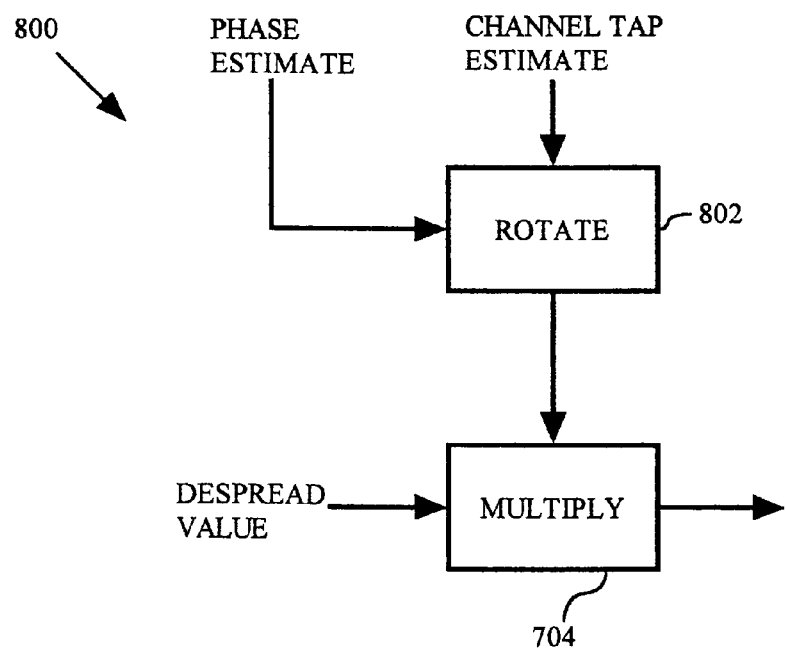
FIG. 8 is an alternative exemplary embodiment of the combine unit.

An alternative embodiment of combine unit 606a is given in FIG. 8. The channel tap estimate is rotated using the phase estimate in rotate unit 802, providing a rotated channel tap estimate. Rotate unit 802 operates in a manner similar to de-rotate unit 506, except that the channel tap estimate is de-rotated by the negative of the phase estimate. This is equivalent to rotating by the phase estimate. In multiply unit 704, the despread value is multiplied by the conjugate of the rotated channel tap estimate, providing the combined value.

The phase unwrapping is advantageous when the signal level is strong and there is a sudden change in the frequency or phase error. However, if the signal fades, then the unwrapping can lead to instability. One solution would be to adapt the unwrapping, inhibiting it when the signal fades. Signal fading could be detected using the magnitude square of the despread value or the magnitude square of the channel tap estimate.

Figure 9:
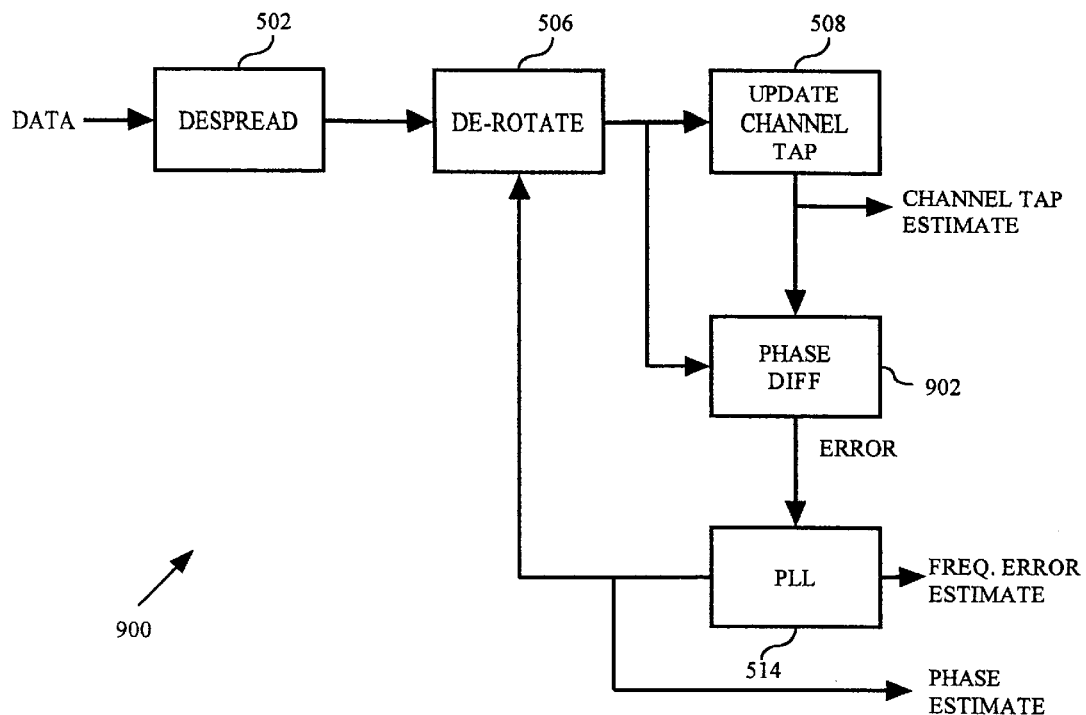
FIG. 9 illustrates a frequency and channel tracker according to another exemplary embodiment of the present invention.

Another alternative is to only allow the phase error signal to be between two limiting values, for example −180 degrees and +180 degrees. This approach is illustrated in FIG. 9, in which like items correspond to like items in FIG. 5. The operation is similar to that described for FIG. 5, except that the phase unwrapping operations have been omitted. The phase difference, computed in phase diff. device 902, would typically be computed by multiplying the complex de-rotated despread value with the complex channel tap first, then determining the phase of the result. The phase diff. device 902 represents the phase difference in a limited range, preferably −180 to 180 degrees or its equivalent.

The phase difference can be computed and approximated in a number of ways. Let the de-rotated, despread complex value be denoted $x=I+jQ$, and let the updated channel tap be denoted $c=D+jE$. The phase difference is the angle of de-rotated, despread value $(I+jQ)$ times the conjugate of the updated channel tap $(D−jE)$. Thus, the phase difference is given by the angle of $p=S+jT$, where $S=ID+QE$ and $T=QD−IE$. One approach would be to take the arctangent of T divided by S, taking the signs of T and S into account to obtain a four quadrant result. Another approach would be to take the arcsine of T divided by the product of the magnitude of x and the magnitude of c. Assuming the phase difference is small, the arcsine operation could be eliminated. Finally, the phase difference could be quantized to $−a$ and $a$, where $a$ is a fixed parameter, e.g., a degree. For this case, one need only determine the sign of T, i.e., the sign of $QD−IE$. It may be desirable to allow the phase difference to have a third value, zero, for example, when $QD−IE$ equals zero. These approaches can be used in phase diff. unit 512 as well.

Another design issue involves the interaction of the PLL and the channel tracker. If the channel tracker is a simple, first-order tracker, then the coupled approach given in FIGS. 5 and 9 works well. However, if the channel tracker is a second-order tracker, e.g. tracks the channel coefficient and its derivative, then the coupling may not work as intended. Channel trackers typically have faster response than the PLL. Thus, a second-order channel tracker could track some of the frequency error, so that the PLL is not fully utilized.

Figure 10:
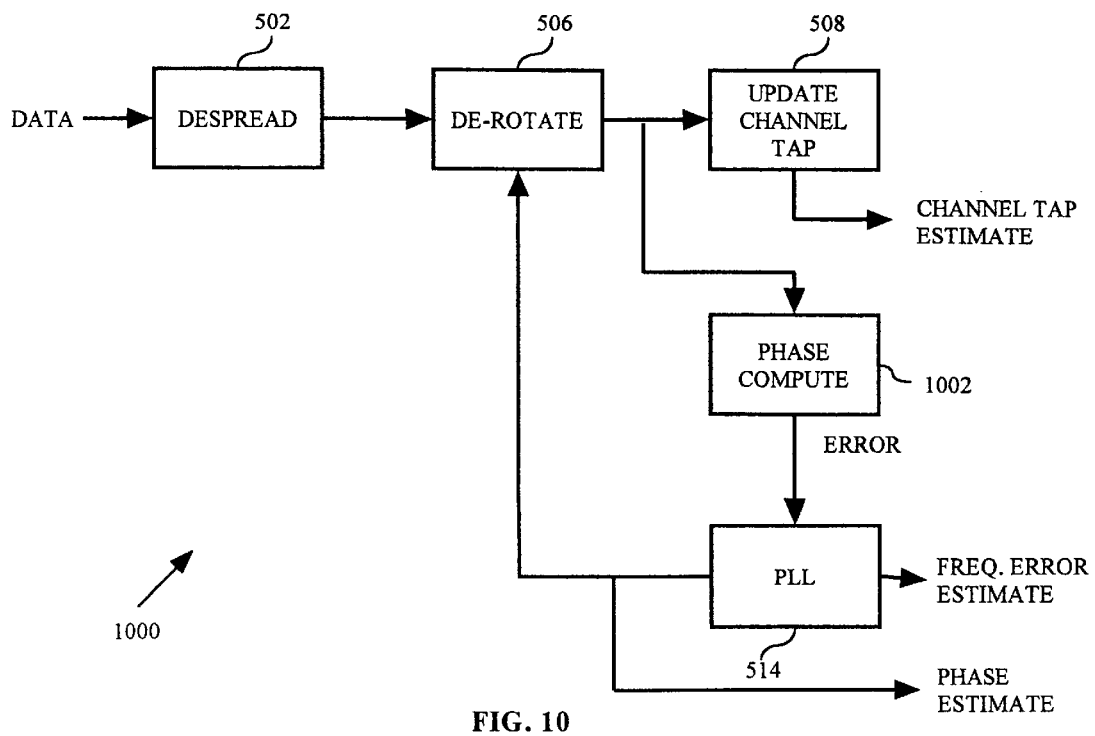
FIG. 10 depicts a frequency and channel tracker according to yet another embodiment of the present invention.

To avoid this problem, the AFC can be performed upstream of channel tracking as illustrated in FIG. 10. For this exemplary embodiment, unwrapping is not included, although it will be understood by one skilled in the art how to include the unwrapping described above, if desired. The data are provided to despread unit 502, which produces despread values. These despread values are de-rotated in de-rotate unit 506, using the phase estimate from PLL 514. The de-rotated despread values are provided to update channel tap unit 508, which produces a channel tap estimate. The de-rotated despread values are also provided to phase compute unit 1002, which determines the phase of the de-rotated despread value. This phase is treated as the phase error input to PLL 514, which produces phase and frequency error estimates.

When a Rake finger is first allocated, initialization and start-up procedures can be used to ensure good performance. First, if a new echo has been discovered, the frequency error estimate associated with that echo can be initialized to the frequency error estimate being produced by another Rake finger, for example the strongest finger. If this is the very first finger to be allocated, the frequency error can be initialized to zero. Also, the phase estimate is preferably initialized to a value related to despread values associated with the new finger. For example, the phase estimate could be initialized to the phase of the first despread value. The channel tap estimate can be also be initialized using despread values, for example the first despread value.

Once initialized, an adaptive step size PLL can be used for quick convergence, alternatively fixed step sizes can be used, though convergence may be longer. If the finger starts with an initial frequency error estimate of 0, then the adaptive approach is preferable.

While an example of two signal echoes was given above, the present invention applies to any number of echoes. The present invention also applies to signal images received from different base stations, which happens during soft handoff. One approach is to produce a frequency estimate associated with each base station. For example, two signal processing branches can be assigned to images from base station A. These branches would form a combined frequency estimate. Another two signal processing branches might be assigned to images from base station B and would also form a combined frequency estimate. These two estimates could also be combined using the approaches described previously. If the frequency accuracy of the two base stations is good, then the frequency estimates from all processing branches associated with all images (two from base A, two from base B) would be combined. Thus, each branch would correspond to a particular arrival time of an image and a particular despreading code, since the base stations typically use different spreading codes.

While the present invention has been described assuming a pilot channel with a fixed +1 underlying symbol stream, the present invention is also applicable to other cases. First, consider the case of pilot symbols placed periodically within a traffic channel. For frequency acquisition, correlations to these symbols could be used in FIG. 3. As part of despread unit 302, the symbol values (if not all the same) would be used to remove the modulation on the despread values by multiplying the despread values by the conjugate of the known symbol values. Similarly, for frequency and channel tracking in FIG. 5, the conjugates of symbol values would be used to multiply the despread values in despread unit 502. If the symbol values are not all the same, then the despread correlation length needs to correspond to a symbol period or less.

Second, consider the case of using traffic symbols. In this case, the symbols could be detected, giving detected values. These detected values would be used in the same way known pilot symbols are used as described above. To obtain correlations longer than one symbol period, successive despread values with symbol modulation removed can be added together.

The present invention has been described in terms of specific embodiments to facilitate understanding. The above embodiments, however, are illustrative rather than restrictive. It will be readily apparent to one skilled in the art that departures may be made from the specific embodiments shown above without departing from the central spirit and scope of the invention. Therefore, the invention should not be regarded as being limited to the above examples, but should be regarded instead as being commensurate in scope with the following claims including equivalents thereof.

We claim:

1. A frequency acquisition unit comprising:
    a correlator for despreading data samples to produce despread values;
    an estimating unit for producing a frequency error estimate using said despread values;
    a corrector for forming a frequency correction factor using said frequency error estimate;
    a processing circuit for processing said despread values using said frequency correction factor to produce processed values; and
    means for producing a refined frequency error estimate using said processed values and said frequency error estimate, wherein said refined frequency error estimate is used in subsequent iterations to form said frequency correction factor.

2. The frequency acquisition unit of claim 1, wherein said estimating unit further comprises:
    a differential detector for processing said despread values to produce detector output values;
    an accumulator for accumulating said detector output values; and
    an angle detector for determining an angle associated with said accumulated detector values and outputting said frequency error estimate.

3. The frequency acquisition unit of claim 1, wherein said correlator further comprises means for removing data modulation.

4. The frequency acquisition unit of claim 1, further comprising:
    a switch for selectively supplying either said despread values or said processed values to said estimating unit.

5. The frequency acquisition unit of claim 4, further comprising:
    a de-rotating unit for de-rotating despread values to produce de-rotated values; and
    an accumulator for accumulating said de-rotated values and outputting said de-rotated values to said switch.

6. A frequency and channel tracking unit comprising:
    means for despreading data samples to produce despread values;
    means for processing said despread values to produce instantaneous channel measurements;
    means for channel tracking using said instantaneous channel measurements to produce channel estimates;
    means for computing a phase error using said channel estimates and said instantaneous channel measurements; and
    means for producing a phase estimate using said phase error.

7. The frequency and channel tracking unit of claim 6, wherein said means for processing said despread values uses said phase estimate to produce said instantaneous channel measurements.

8. The frequency and channel tracking unit of claim 6, wherein said means for computing a phase error employs phase unwrapping.

9. The frequency and channel tracking unit of claim 6, wherein said means for producing a phase estimate also produces a frequency error estimate.

10. A method of frequency acquisition comprising the steps of:

despreading data samples to produce despread values;

producing a frequency error estimate using said despread values;

forming a frequency correction factor using said frequency error estimate;

processing said despread values using said frequency correction factor to produce processed values; and producing a refined frequency error estimate using said processed values and said frequency error estimate, wherein said refined frequency error estimate is used in subsequent iterations to form said frequency correction factor.

11. The frequency acquisition method of claim 10, wherein said step of producing said frequency error estimate further comprises the step of:

differentially detecting said despread values to produce detector output values;

accumulating said detector output values; and determining an angle associated with said accumulated detector values and outputting said frequency error estimate.

12. The frequency acquisition method of claim 10, wherein said step of despreading further comprises the step of removing data modulation.

13. The frequency acquisition method of claim 10, further comprising the step of:

selectively supplying either said despread values or said processed values to a means for producing a frequency error estimate.

14. A Rake receiver comprising:

means for despreading data samples using a traffic channel despreading code to produce traffic despread values;

means for despreading data samples using a pilot channel despreading code to produce pilot despread values;

means for processing said pilot despread values to produce instantaneous channel measurements;

means for channel tracking using said instantaneous channel measurements to produce channel estimates;

means for computing a phase error using said channel estimates and said instantaneous channel measurements;

means for producing phase and frequency error estimates using said phase error; and means for processing said traffic despread values using said channel estimates and said phase estimates to detect information symbols.

15. A frequency and channel tracking unit comprising:

means for despreading data samples to produce despread values;

means for de-rotating said despread values to produce de-rotated despread values;

means for producing frequency error and phase estimates using said de-rotated despread values; and means for producing channel estimates using said de-rotated despread values, wherein said phase estimate is initialized to the phase of a despread value.

16. A Rake receiver comprising:

means for despreading data samples using a traffic channel despreading code to produce traffic despread values;

means for despreading data samples using a pilot channel despreading code to produce pilot despread values;

means for de-rotating said pilot despread values to produce de-rotated values;

means for channel tracking using said de-rotated values to produce channel estimates;

means for computing a phase error using said de-rotated values;

means for producing phase and frequency error estimates using said phase error; and means for processing said traffic despread values using said channel estimates and said phase estimates to detect information symbols.

17. A frequency and channel tracking unit according to claim 6, in which the phase estimate is initialized to the phase of a despread value.

18. A frequency and channel tracking unit according to claim 9, in which the frequency error estimate is initialized to a frequency error estimate corresponding to another frequency and channel tracking unit.

19. A frequency and channel tracking unit according to claim 15, in which the frequency error estimate is initialized to a frequency error estimate corresponding to another frequency and channel tracking unit.

20. A frequency and channel tracking unit according to claim 6, in which said means for producing a phase estimate uses a phased locked loop whose step sizes vary in time.

21. A frequency and channel tracking unit according to claim 15, in which said means for producing a phase estimate uses a phased locked loop whose step sizes vary in time.

22. A method for detecting information symbols comprising the steps of:

despreading data samples using a traffic channel despreading code to produce traffic despread values;

despreading data samples using a pilot channel despreading code to produce pilot despread values;

processing said pilot despread values to produce instantaneous channel measurements;

channel tracking using said instantaneous channel measurements to produce channel estimates;

computing a phase error using said channel estimates and said instantaneous channel measurements;

producing phase and frequency error estimates using said phase error; and processing said traffic despread values using said channel estimates and said phase estimates to detect information symbols.

23. A method for producing channel estimates comprising the steps of:

initializing a phase estimate to a phase of a despread value;

despreading data samples to produce despread values;

de-rotating said despread values to produce de-rotated despread values;

producing frequency error and phase estimates using said de-rotated despread values; and producing channel estimates using said de-rotated despread values.

24. A method for detecting symbols comprising:

despreading data samples using a traffic channel despreading code to produce traffic despread values;

despreading data samples using a pilot channel despreading code to produce pilot despread values;

de-rotating said pilot despread values to produce de-rotated values;

channel tracking using said de-rotated values to produce channel estimates;

computing a phase error using said de-rotated values;

producing phase and frequency error estimates using said phase error; and processing said traffic despread values using said channel estimates and said phase estimates to detect information symbols.

* * * * *